(12) United States Patent
Taniguchi et al.

(10) Patent No.: US 6,804,875 B2
(45) Date of Patent: Oct. 19, 2004

(54) METHOD OF MOUNTING ELASTIC WAVE GENERATOR

(75) Inventors: Ryosuke Taniguchi, Tokyo (JP); Shinichi Hattori, Tokyo (JP); Takahiro Sakamoto, Tokyo (JP); Takashi Shimada, Tokyo (JP); Kanji Matsuhashi, Hiroshima (JP)

(73) Assignees: Mitsubishi Denki Kabushiki Kaisha, Tokyo (JP); Matsuhashi Techno Research Co., Ltd., Hiroshima-ken (JP)

( * ) Notice: Subject to any disclaimer, the term of this patent is extended or adjusted under 35 U.S.C. 154(b) by 0 days.

(21) Appl. No.: 10/411,278

(22) Filed: Apr. 11, 2003

(65) Prior Publication Data

US 2003/0160522 A1 Aug. 28, 2003

Related U.S. Application Data

(62) Division of application No. 09/697,678, filed as application No. PCT/JP99/02249 on Apr. 27, 1999, now abandoned.

(30) Foreign Application Priority Data

Apr. 28, 1998 (JP) ............................................ 10-119334

(51) Int. Cl.[7] ........................ H02K 15/00; H02K 15/14; H02K 15/16
(52) U.S. Cl. ........................ 29/596; 29/602.1; 29/609; 29/609.1; 340/854.4; 340/855.6; 310/36; 367/82; 73/152.03; 73/152.47
(58) Field of Search .............................. 29/596, 602.1, 29/609, 609.1; 340/854.4, 855.6; 310/36; 367/82; 73/152.47, 152.03

(56) References Cited

U.S. PATENT DOCUMENTS

| | | | |
|---|---|---|---|
| 3,900,827 A | | 8/1975 | Lamel et al. |
| 3,906,434 A | | 9/1975 | Lamel et al. |
| 4,283,780 A | | 8/1981 | Nardi |
| 5,128,902 A | | 7/1992 | Spinnler |
| 5,222,049 A | | 6/1993 | Drumheller |
| 5,365,997 A | * | 11/1994 | Helgesen et al. ........... 164/103 |
| 5,568,448 A | * | 10/1996 | Tanigushi et al. ............. 367/82 |
| 5,675,325 A | * | 10/1997 | Taniguchi et al. ........ 340/854.4 |
| 6,272,916 B1 | * | 8/2001 | Taniguchi et al. ........ 73/152.47 |

* cited by examiner

*Primary Examiner*—Carl J. Arbes
*Assistant Examiner*—Tim Phan
(74) *Attorney, Agent, or Firm*—Leydig, Voit & Mayer, Ltd.

(57) ABSTRACT

An elastic wave generator includes an excitation coil, a magnetostriction oscillator around which the excitation coil is wound and an oscillator support. The excitation coil is wound around the oscillator, which is made of laminated magnetostriction sheets having a positive strain characteristic, in which length varies directionally upon magnetic excitation. The oscillator support has a first support surface bearing against a first end surface of the magnetostriction oscillator, intersecting the direction along which the length of the magnetostriction oscillator changes and a second support surface shrink-fit against a second end surface of the magnetostriction oscillator, intersecting the direction along which the length of the magnetostriction oscillator changes. Thus, the changes in the length of the magnetostriction oscillator due to the magnetic excitation of the excitation coil appearing at the first and second end surfaces is directly supported by the first and second support surfaces. The magnetostriction oscillator is shrink-fit by cooling so it may be placed between the support surfaces while cooled.

9 Claims, 19 Drawing Sheets direction of acoustic radiation a: no pre-load
b: small pre-load
c: large pre-load
Ea: maximum magnetostriction factor with no pre-load
Ec: maximum magnetostriction factor with large pre-load

METHOD OF MOUNTING ELASTIC WAVE GENERATOR

CROSS REFERENCE TO RELATED APPLICATION

This is division of U.S. patent application Ser. No. 09/697,678 filed Oct. 27, 2000, now abandoned, which is a continuation of International Application PCT/JP99/02249, with an international filing date of Apr. 27, 1999, designating the United States, the content of which is hereby incorporated by reference into the present application.

BACKGROUND OF THE INVENTION

This invention relates to an elastic wave generator, magnetostriction oscillator mounting structure and method.

An elastic wave generator is a device for generating an acoustic longitudinal elastic wave and expected to be utilized in the following variety of fields:

(1) a transmitter of an acoustic transmission apparatus utilizing a drilling pipe as an acoustic signal transmitting medium;

(2) a transmitter of an acoustic transmission apparatus utilizing a metal structural body or a rigid structural body as an acoustic signal transmitting medium;

(3) an apparatus for injecting or internally generating a longitudinal elastic wave into a concrete or metallic structural body for inspecting characteristics, property changes, flaws or the like of the structural body;

(4) an apparatus for injecting or internally generating a longitudinal elastic wave into a concrete or metallic structural body for structural analysis of a building or a mechanical structural body;

(5) a seismic wave generating apparatus for evaluating stratum or the like;

(6) an acoustic speed measuring apparatus for measuring characteristics of strata or the like; and (7) other apparatus for non-destruction inspection, measurement, survey, information transmission or the like in which a relatively large vibration is effective.

Heretofore, the method for applying a stress to a mechanical structure includes a hydraulic press generating a static compression stress, an expansion test machine generating a static tensile force or a hammer or a falling object generating a dynamic stress. In the method using the hammer or the falling object, it is difficult to control the stress at will so that the detailed examination of the workpiece cannot be carried out.

On the other hand, a method for converting strain into stress as a method for freely controlling the stress is used in acoustic measurement of a relatively small structure having a relatively small thickness or uniform composition. However, since this method is not suitable for use in terms of a large structure or a sparse material which needs large stress, the measurement of these materials had to be achieved by generating a large stress with a hammer or a falling substance.

Therefore, in order to generate a controlled large stress, an attention has been paid to materials that have extremely high strain characteristics and a strain-stress conversion apparatus utilizing these materials (piezoelectric material, super-magnetostriction material) has been studied. However, these materials, such as brittle and weak sintered alloys or easily bendable and deformable materials, have compression strengths that are too small not to self-destruct upon the generation of the strain in the stressed state.

While it has been known that the generated stress can be made large when the strain is generated by energizing the piezoelectric material or the magnetostriction material put under the pre-stressed state, the compression strength of the material was too small and the material was self-destroyed when a strain is generated even with a small pre-stress. Therefore, it was not possible to obtain at will a large stress, such as a stress of 10–30 kgf/mm$^2$, in order to generate a strong elastic wave (acoustic signal), so that this material was not suitable to apply to a large structural body or a sparse material.

Therefore, while a strain-stress conversion device employing these materials (piezoelectric material, super magnetostriction material) having high strain characteristics have been used in the acoustic measurement of a relatively thin matter or a structural body of a homogeneous composition, the measurement with the hammer or the falling object has conventionally been used for a large structural body or the materials of sparse composition. Although the realization of the acoustic transmission through the use of the drilling pipes for oil rigs of a length of from several hundred meters to several thousand meters have been believed, since there has been provided no realistic acoustic longitudinal elastic wave generator that can provide a large stress wave, the pressure wave transmission or mud pulse system in which drilling mud is used as the transmission medium, has been employed.

According to the study and the analysis of the inventors of the present invention, the unsolved technical problems in these conventional fields of application are given below:

(1) generation and injection of a stress wave at will in a large metallic structural body;

(2) injection of a stress wave at will into a structural body having a composition of an internal disturbance reflection such as concrete, rock or plastic; and (3) generation and injection of an acoustic longitudinal wave of from several Hz to several ten kHz at and into a structural body.

Then, the present invention is expected to be utilized in a wide variety of fields as discussed previously, so that both the present invention and the conventional technique will be described in terms of examples in which they are applied to the field of oil rigs.

For example, Japanese Patent Laid-Open No. 8-130511 discloses the system in which the information of the bottom of the well being dug in an oil well is transmitted by an elastic wave (acoustic) signal using the drill pipes as a transmission medium.

FIGS. 23 to 25b are views showing the system disclosed in Japanese Patent Laid-Open No. 8-130511 and FIG. 23 being a view showing the overall construction of the oil well facility, FIG. 24 being a fragmental sectional view showing the drill collar portion at the well bottom of the drill pipe, FIG. 25a being a plan view and FIG. 25b being a sectional side view.

In FIGS. 23–25b, 100 shows a tower for drilling an oil well. 24 is a drill pipe inserted into the ground from the tower 100 and having straight cylindrical pipes each having a length of about 8 meters, connected to constitute an assembly of a length of several hundred meters to several thousand meters, the drill pipe being driven to rotate by an unillustrated drive unit mounted to the well tower 100. Disposed within the drill collar 22 of the drill pipe 24 at the bottom portion of the well is a magnetostriction oscillator 34. 25 is a sensor for detecting various information necessary for digging, the various information signals from the sensor 25 at the well bottom are converted into digital signals so that an electric current varying in accordance with the converted digital information signal is supplied to an excitation coil 36 of the magnetostriction oscillator 34, which converts the signal into an elastic wave (acoustic signal) to be transmitted through the drill pipe 24 to the ground surface. 26 is a receiver installed in the portion of the tower 100 of the drill pipe 24, 27 is a signal processing apparatus for processing to demodulate the received signal of the receiver 26 to monitor the state of the bottom of the well, such as the temperature of the well, the tilt of the drill tip or the like.

The mounting of the magnetostriction oscillator 34 to the drill collar 22 is achieved by the cantilevered mounting as shown in the sectional side view of FIGS. 25*a* and 25*b* in which a clamping screws 39 and rock nuts 40 are used to make a canti-lever attachment (canti-levered system), so that when the magnetostriction oscillator 34 is elongated by energization, the reaction force from the inertia weight 42 disposed at the free end side is transmitted to the drill collar 22 through the horn 38 to become an elastic wave. Therefore, the injection efficiency of the elastic wave (acoustic) energy from the magnetostriction oscillator 34 to the drill pipe on the order of 0.01 to 0.1, so that, when the drill pipe 24 of several hundred meters to several thousand meters long is used as a transmission medium in actuality, the elastic wave (acoustic wave) does not reach the receiver 26 at the ground level and this system is not practically used in oil well drilling, but the pressure wave transmission or mud pulse system, in which drilling mud is used as a transmission medium, is utilized.

Thus, according to the elastic wave generating device employing the conventional magnetostriction oscillator 34, it is difficult to generate and inject a large stress wave (elastic wave) of a desired size in a large structural body.

DISCLOSURE OF THE INVENTION

The present invention has been made in order to solve the above-discussed problems and has as its object the provision of an elastic wave generator, a magnetostriction oscillator mounting structure and a mounting method free from the above-discussed problems.

With the above objects in view, the present invention resides in an elastic wave generator comprising: an excitation coil; a magnetostriction oscillator around which the excitation coil is wound and made of a lamination of magnetostriction sheets having a metallic crystalline structure which exhibits positive strain characteristics in which its length varies directionally upon magnetic excitation; and an oscillator support having a first support surface shrink-fit against a first end surface of the magnetostriction oscillator intersecting the direction along which the length of the magnetostriction oscillator changes and a second support surface shrink-fit against a second end surface of the magnetostriction oscillator intersecting the direction along which the length of the magnetostriction oscillator changes, whereby the changes in the length of the magnetostriction oscillator due to the magnetic excitation of the excitation coil appearing at the first and second end surfaces is directly supported by the first and second support surfaces. Therefore, the elastic wave generator can be realized in which the generation and the injection of a large stress wave (elastic wave) that has not heretofore been solved.

The elastic wave generator may comprise an excitation coil; a magnetostriction oscillator around which the excitation coil is wound and made of a lamination of magnetostriction sheets having a metallic crystalline structure which exhibits positive strain characteristics in which its length varies directionally upon magnetic excitation; a magnetic bias device having a magnetic path in common with the magnetostriction oscillator; and an oscillator support having a first support surface shrink-fit against a first end surface of the magnetostriction oscillator intersecting the direction along which the length of the magnetostriction oscillator changes and a second support surface shrink-fit against a second end surface of the magnetostriction oscillator intersecting the direction along which the length of the magnetostriction oscillator changes, whereby the changes in the length of the magnetostriction oscillator due to the magnetic excitation of the excitation coil appearing at the first and second end surfaces is directly supported by the first and second support surfaces. Therefore, the elastic wave generator can be realized in which the generation and the injection of a large stress wave (elastic wave) that has not heretofore been solved and the operating point can be arbitrarily set.

The present invention also resides in an elastic wave generator mounting structure for mounting a magnetostriction oscillator to an object to which an elastic wave is irradiated, the magnetostriction oscillator comprising an excitation coil wound around a stack of thin sheets of a metallic magnetostriction material bonded together with an electrically insulating bonding agent for generating an elastic wave in the direction parallel to the thin sheet by an excitation current flowing through the excitation coil; the magnetostriction oscillator having two parallel surfaces intersecting at right angles with an elastic wave radiation direction and spaced apart from each other by a distance A at room temperature and a distance A1 at a lower temperature; the object having a hole or a recess having two parallel wall surfaces intersecting at right angles with the elastic wave radiation direction and spaced apart from each other by a distance B at room temperature; a relationship among the distances being A>B>A1; and the magnetostriction oscillator being held in the hole or recess by the shrink-fit against the wall surfaces in which the magnetostriction oscillator is cooled and contracted and then returning to room temperature to expand the magnetostriction oscillator within the hole or recess. Therefore, the magnetostriction oscillator is held in the pre-stressed state by the shrink-fit, so that the pre-stress incomparably stronger than that obtained by the conventional tightening screw can be applied.

The present invention also resides in a method for mounting a magnetostriction oscillator to an object to which an elastic wave is irradiated, the magnetostriction oscillator comprising an excitation coil wound around a stack of thin sheets of a metallic magnetostriction material bonded together with an electrically insulating bonding agent for generating an elastic wave in the direction parallel to the thin sheet by an excitation current flowing through the excitation coil; the method comprising: a magnetostriction oscillator shaping step for shaping two opposing elastic wave radiation surfaces formed by stacking the thin sheets into two parallel surfaces intersecting at right angles with an elastic wave radiation direction and spaced apart from each other by a distance A at room temperature; an object shaping step for providing a hole or a recess having two parallel wall surfaces intersecting at right angles with the elastic wave radiation direction and spaced apart from each other by a distance B at room temperature between two wall surfaces at room temperature which is smaller than the distance A; a cooling step for cooling the magnetostriction oscillator until the distance A becomes equal to a distance A1 smaller than the distance B of the hole or the recess; and an insertion step for inserting the cooled magnetostriction oscillator into the hole or recess. Therefore, the magnetostriction oscillator is held between the wall surfaces of the recess or the hole in the shrink-fit state due to the expansion at the room temperature before the cooling, so that it is held in the pre-stressed state due to the shrink-fit that is incomparably stronger than that obtained by the conventional tightening screw can be applied.

DESCRIPTION OF THE PREFERRED EMBODIMENTS

Embodiment 1

Figure 1:
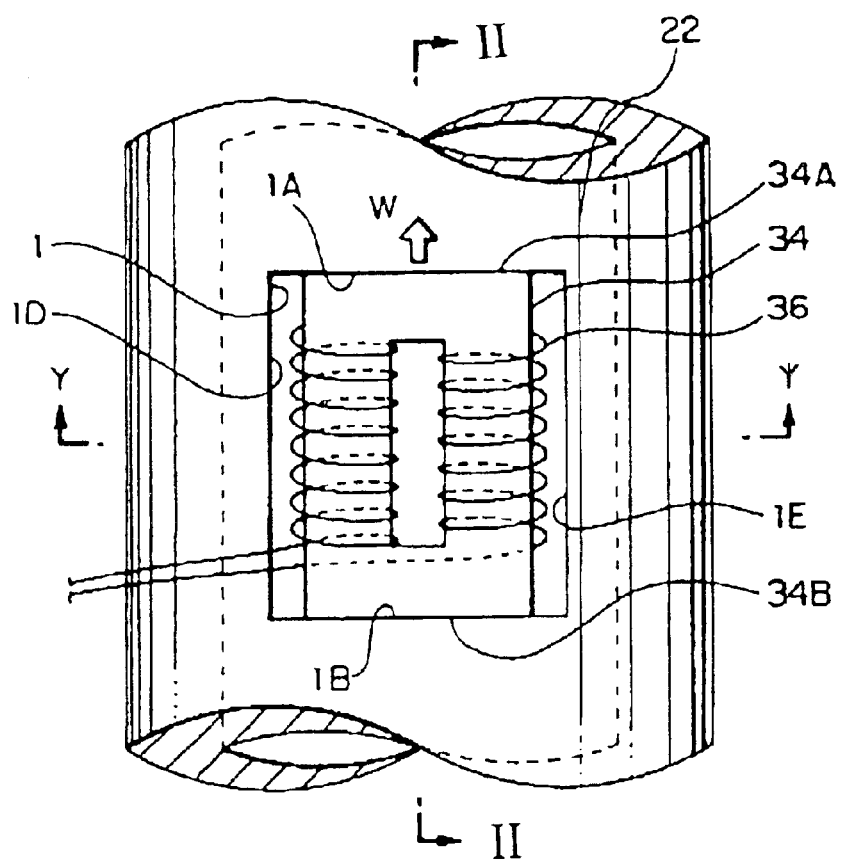
FIG. 1 is a plan view of an elastic wave generator of the first embodiment of the present invention.
Figure 2:
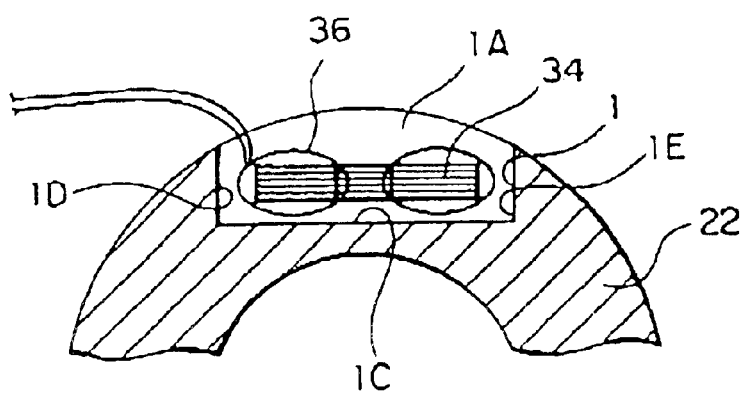
FIG. 2 is a sectional view taken along line II—II of FIG. 1.
Figure 3:
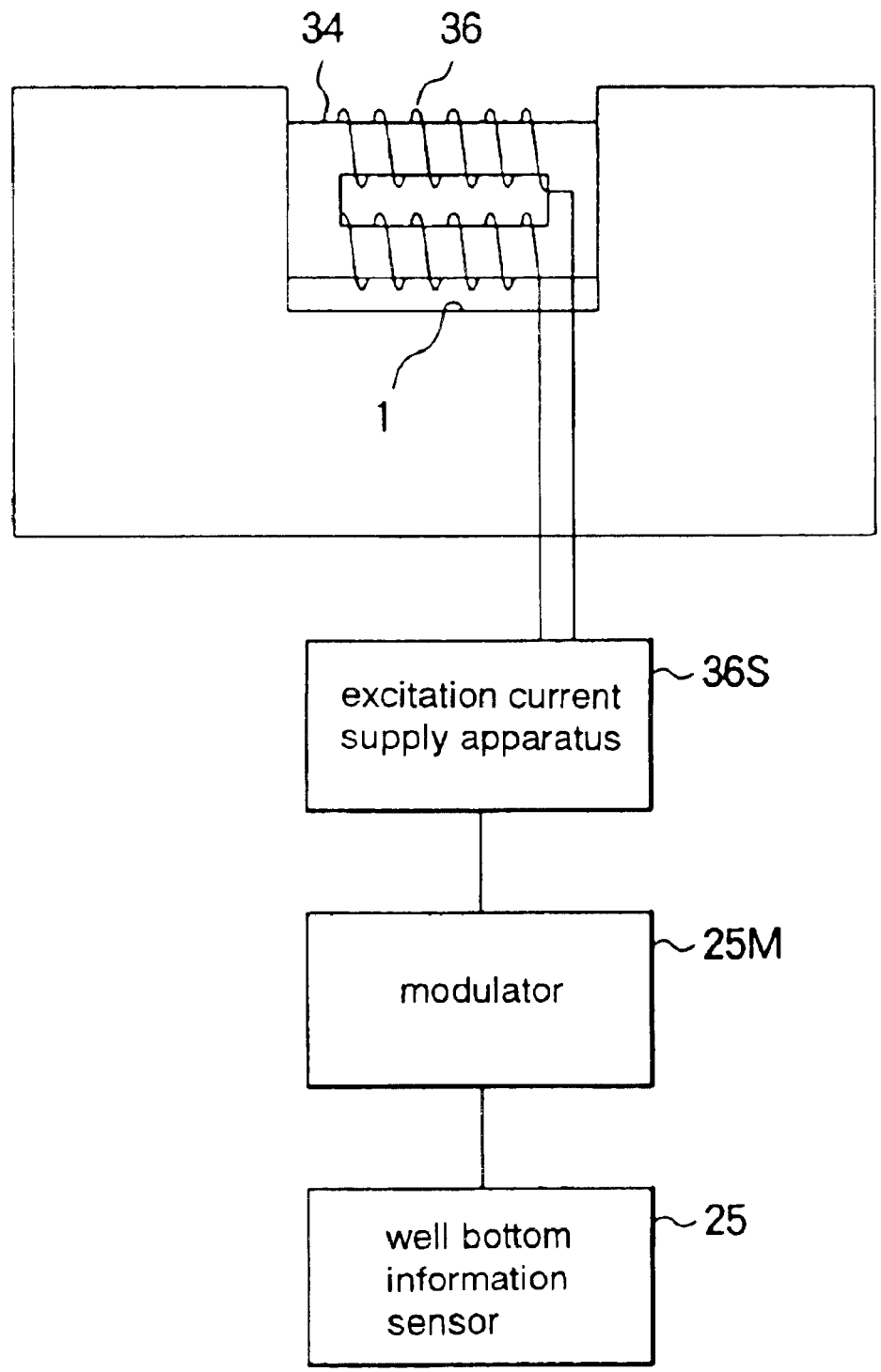
FIG. 3 is a circuit diagram of the first embodiment of the present invention.

The elastic wave generator of the present invention will now be describe in terms of the oil well facility, in which the oscillator support (object) is drill collar (tubul body) used in the oil digging facility. FIG. 1 is a plan view showing the state in which the magnetostriction oscillator is mounted, FIG. 2 is a sectional view taken along line II—II of FIG. 1 and FIG. 3 is a circuit diagram elastic wave generator.

In FIGS. 1–3, 22 is a non-magnetic magnetostriction oscillator support to which the object is to be mounted, which is the drill collar (tubular body) made of stainless steel in the oil digging facility, and a recess 1 having a rectangular shape in plan is formed in the front surface. 1A and 1B are precisely flat support surfaces parallel to each other and are polished into a mirror finish. 1C is a flat bottom surface of the recess 1 that is at right angles to the support surfaces 1A and 1B. 1D and 1E are sidewall surfaces defining right angles with respect to the support surfaces 1A and 1B and are parallel to each other.

34 is a magnetostriction oscillator having positive strain characteristics in which its length directionally expands upon the excitation, the magnetostriction thin sheets of a metallic crystalline structure such as an iron-chromium alloy, an iron-cobalt alloy or the like are stacked into a lamination with an electric insulation between each of the magnetostriction thin sheets and secured into a rigid body by a thermo-setting resin.

A practically suitable magnetostriction thin sheet having a positive strain characteristic includes a Fe—Co magnetostriction alloy (such as C: 008 wt %, Si: 0.08 wt %, Mn: 0.07 wt %, Co: 49.22 wt %, Vd: 1.546 wt % and Fe: residuary) disclosed in Japanese Patent Laid-Open No. 10-88301 entitled "iron-cobalt alloy plate manufacturing method". While an alloy of Fe-70 wt % Co is known as an iron-cobalt alloy and an alloy of Fe—Al is known as an alloy of low magnetic permeability, these alloys are not suitable to be used for the purpose of the present invention.

The magnetostriction oscillator 34 is firmly connected to the oscillator support 22 within the recess 1, with one end surface 34A of the magnetostriction oscillator 34 made shrink-fit against one of the support surface 1A of the recess 1 and the other end surface 34B made shrink-fit against the other end surface 34B. Also, the respective end surfaces 34A and 34B of the magnetostriction oscillator 34 are polished into a flat mirror surface in a manner similar to the support surfaces 1A and 1B of the oscillator support 22. The term "shrink-fit" herein means cooling-fit and heating-fit. The pre-load (pressurization) applied to the magnetostriction oscillator 34 by the shrink-fit at this time is 10–30 kg/mm$^2$ and, to obtain a pre-load of 30 kg/mm$^2$, the material of the magnetostriction oscillator 34 needs to have a compression strength of about 125 kg/mm$^2$.

36 is a magnetic excitation coil wound around the magnetostriction oscillator 34 and is installed completely within the recess 1 without projecting therefrom together with the magnetostriction oscillator 34. The excitation coil 36 is supplied with an output current representative of the well-bottom information from the current supply apparatus 36S, which generates a current corresponding to the digital signal modulated by the modulator 25M in accordance with the output from the sensor 25 detecting the well-bottom information, such as the temperature of the bottom of the oil well, the inclination or the azimuth of the drill blades at the bottom end of the drill pipe 22.

When an output current corresponding to the well-bottom information is supplied to the excitation coil 36, the excitation coil 36 generates a magnetic field corresponding to the well-bottom information, causing the magnetostriction oscillator 34 having positive strain characteristics to elongate in the direction of an arrow W in FIG. 1 by the generated magnetic field corresponding to the well-bottom information due to the alignment of the magnetic domain. As a result, the large inner stresses (pre-stresses) in the magnetic restriction oscillator 34 and the oscillator support 22 given by the shrink-fit are further increased to become a large stress wave (elastic wave), which is transmitted at a high speed through the drill collar and the drill pipes connected together to the receiver (the receiver 26 in FIG. 21) on the ground surface so that the circumstances at the well-bottom may be monitored according to the output from the demodulator 27 (FIG. 21) on the ground surface.

As seen also from FIG. 1, the opposite end surfaces 34A of the magnetostriction oscillator 34 and the opposing support surfaces 1A of the oscillator support 22 are directed to intersect (intersect at right angles in FIG. 1) with the direction of expansion (the direction of the arrow W) due to the excitation of the magnetostriction oscillator 34 by the excitation coil 36.

According to the utility experiments conducted by the inventors of the present invention, the magnetostriction oscillator 3 is constructed such that the excitation coil 36 is wound around it and is made of the stack of magnetostriction sheets having a metallic crystalline structure which exhibits positive strain characteristics in which its length varies directionally upon magnetic excitation, and the non-magnetic oscillator support 22 having the first support surface 1A shrink-fit against the first end surface 34A of the magnetostriction oscillator 34 intersecting the direction along which the length of the magnetostriction oscillator 34 changes and the second support surface 1B shrink-fit against the second end surface 34B of the magnetostriction oscillator 34 intersecting the direction along which the length of the magnetostriction oscillator 34 changes are provided and the changes in the length of the magnetostriction oscillator 34 due to the magnetic excitation of the excitation coil 36 appearing at the first and second end surfaces 1A and 1B are directly supported by the first and second support surfaces 1A and 1B, so that a large stress such as a stress of 10–30 $kgf/mm^2$ which has not heretofore been expected to be obtainable according to the conventional technique can be realized at will.

Also, the injection efficiency of the elastic wave (stress wave, acoustic wave) energy from the magnetostriction oscillator 34 into the oscillator support 22 (the drill collar, tubular body, object) is substantially equal to 1 which is significantly reduced from 0.01 to 0.1 of that of the conventional design.

Also, although, in the oil digging, the transmission of the elastic wave from the sensor at the well-bottom to the receiver 27 at the ground surface through the drill pipes 24 of a length of several hundred meters to several thousand meters as an elastic wave transmission medium has been considered to be impossible according to the conventional technique, this transmission was proved to be sufficiently realized according to the present invention.

Figure 4:
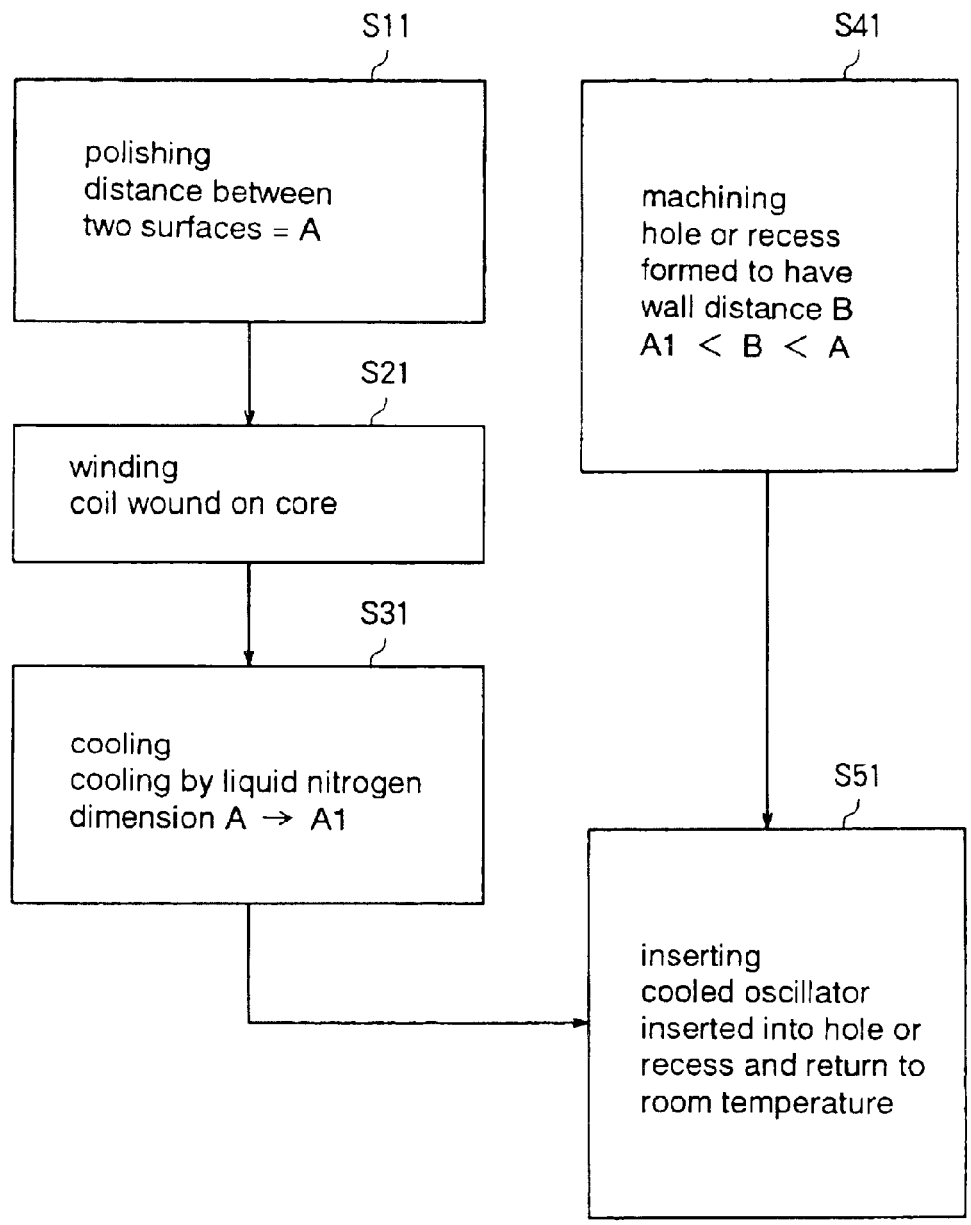
FIG. 4 is a flow chart showing the magnetostriction oscillator mounting method according to the first embodiment of the present invention.
Figure 5A:
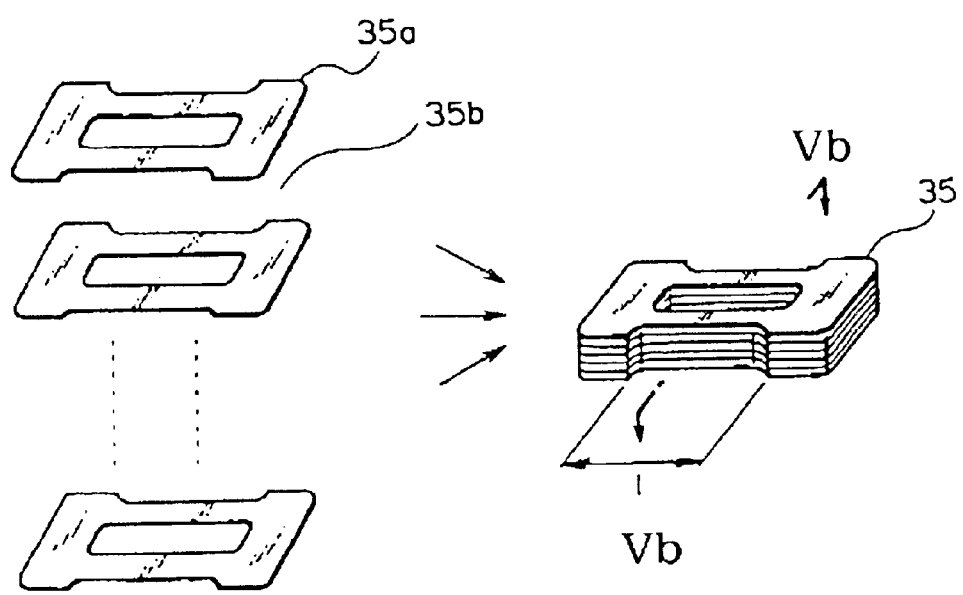
FIGS. 5a and 5b are views for explaining the step S1 in the flow chart of FIG. 4.

FIG. 4 is a flow chart showing the basic steps of the mounting method according to the present invention, in step S1, the core 35 of the magnetostriction oscillator shown in FIG. 5a is manufactured. It is to be noted that the material to be used must endure the temperature of the environment in which the magnetostriction oscillator 34 is used and also the material must endure cooling by liquid nitrogen (about −196° C.). As previously discussed, practically suitable magnetostriction thin sheets having a positive strain characteristic includes a Fe—Co magnetostriction alloy (such as C: 008 wt %, Si: 0.08 wt %, Mn: 0.07 wt %, Co: 49.22 wt %, Vd: 1.546 wt % and Fe: residuary) disclosed in Japanese Patent Laid-Open No. 10-88301 entitled "iron-cobalt alloy plate manufacturing method".

Then, the polishing step starts at a step S11.

Figure 6:
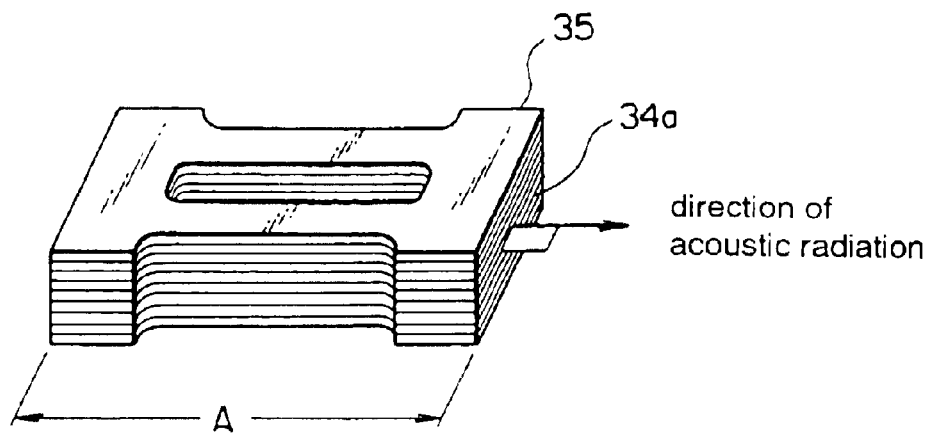
FIG. 6 is a view for explaining the abrading step of step S11 in the flow chart of FIG. 4.

In the polishing step S11, two surfaces (the acoustic radiation surfaces 34a) of the core 35 manufactured in the step S1 positioned at right angles with the direction of vibration are finished to be precisely intersect at right angles and parallel to each other as shown in FIG. 6. The distance between these two surfaces is A at room temperature. The finished surfaces should be as smooth as possible.

If the intersecting angle is not 90° and a vibration is applied, a component force parallel to the contact surface is generated between the object and the magnetostriction oscillator 34, posing a problem that the magnetostriction oscillator 34 displaces during the vibration.

If the surfaces are not parallel, the acoustic radiation surface 34a of the magnetostriction oscillator 34 may not be brought into an intimate contact with the object 22, decreasing the acoustic transmission efficiency.

Figure 7:
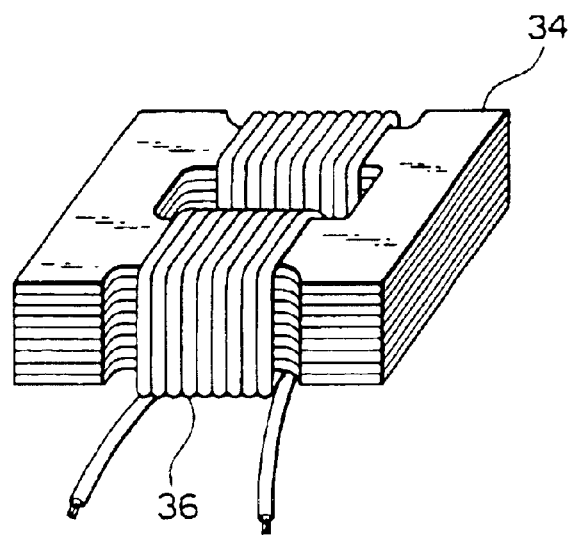
FIG. 7 is a view for explaining the winding step of step S21 in the flow chart of FIG. 4.

Then, a winding step initiates at a step S21 to wind the coil 36 around the core 35 machined at the step S11 as shown in FIG. 7 to finish into the magnetostriction oscillator 34. The material for the coil 36 should also endure the liquid nitrogen temperature as in the step S1. The electrically insulating material that endures −200° C. can be found among those well-known in the field of superconducting engineering.

Figure 8A:
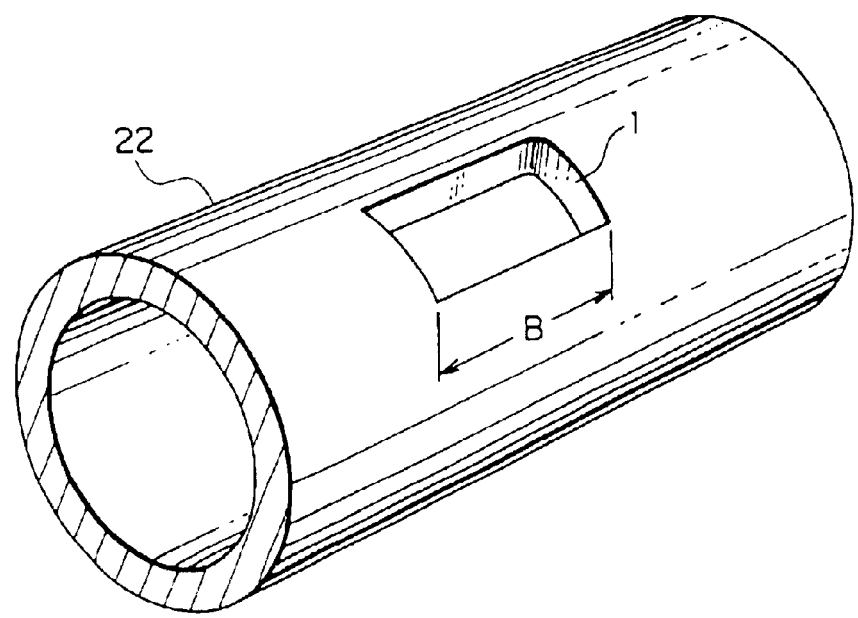
FIGS. 8a to 8c are views for explaining the machining step of step S41 in the flow chart of FIG. 4.
Figure 8B:
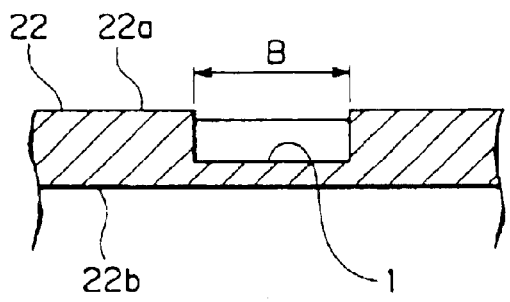
Figure 8C:
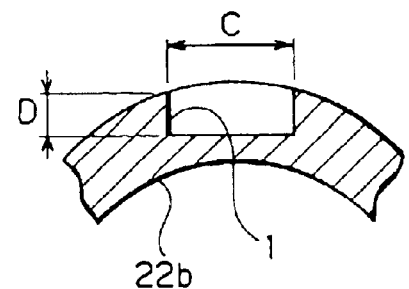

As a step separate from the above steps S1–S21, a hole or a recess for mounting the magnetostriction oscillator 34 is formed in the object in a step S41. FIG. 8a shows an example in which the pipe body 22 is used as the object and the recess 1 is machined in the surface 22a of the pipe body 22 so as to make the direction of vibration parallel to the longitudinal direction of the pipe body 22, FIG. 8b being a longitudinal cross-sectional view and FIG. 8c being a cross-sectional view taken along a plane perpendicular to the pipe axis.

It is to be noted that the pipe body 22 is made of a non-magnetic metal (stainless steel, for example) and the thickness of the pipe body 22 is made sufficiently larger than the thickness h of the stack of the core 35 of the magnetostriction oscillator 34.

The recess 1 has a length dimension B in the direction of acoustic radiation, a width dimension C in the direction defining right angles with respect to the length dimension and a depth dimension D. The dimension B is smaller than the dimension A of the core 35. The dimensions C and D are preferably slightly larger than the outer width of the coil 36 of the magnetostriction oscillator 34 (FIG. 7) to which the coil 36 is wound.

Figure 9:
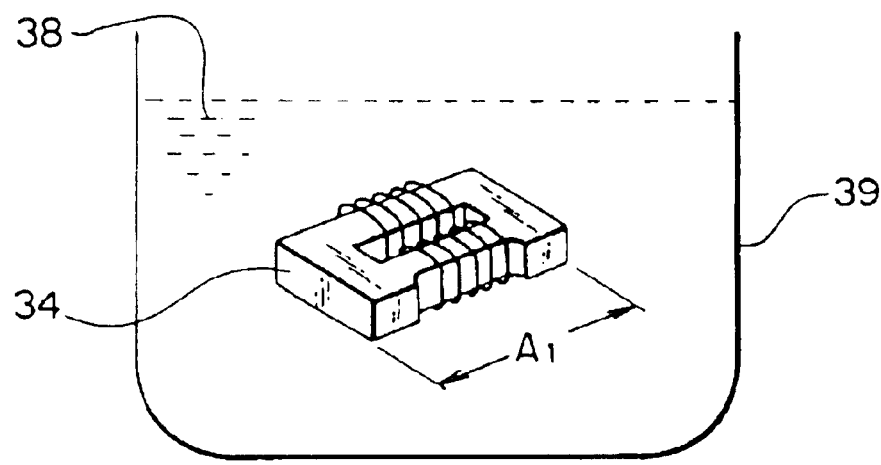
FIG. 9 is a view for explaining the cooling step of step S31 in the flow chart of FIG. 4.

The next step S41 is a cooling step for cooling the magnetostriction oscillator 34 of FIG. 7 by the liquid nitrogen 38 at a normal pressure within the vessel 39 as shown in FIG. 9. The dimension A of the core 35 shrinks to A1 by this cooling step.

Figure 10:
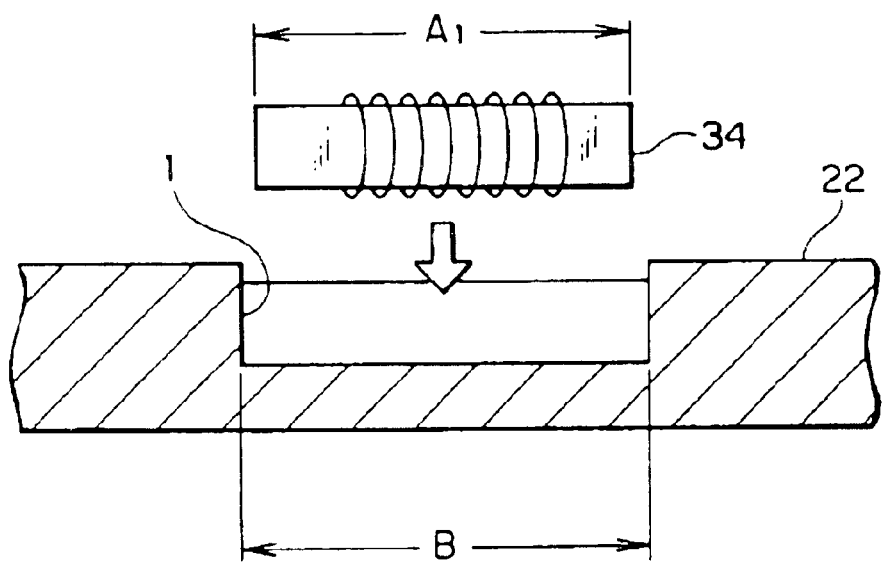
FIG. 10 is a view for explaining the inserting step of step S51 in the flow chart of FIG. 4.

The next step S51 is an insertion step, in which as shown in FIG. 10 the magnetostriction oscillator 34 cooled in the step S31 is inserted into the recess 1 formed in the step S41.

When the distance B between the wall surfaces spaced in the vibration direction (longitudinal direction of the pipe body 22) at room temperature is made smaller than the distance A of the magnetostriction oscillator 34 at room temperature and larger than the dimension A1 of the magnetostriction oscillator 34 at the liquid nitrogen temperature, the insertion can be easily carried out and it is not necessary to carry out the pressure-fit operation.

Figure 11:
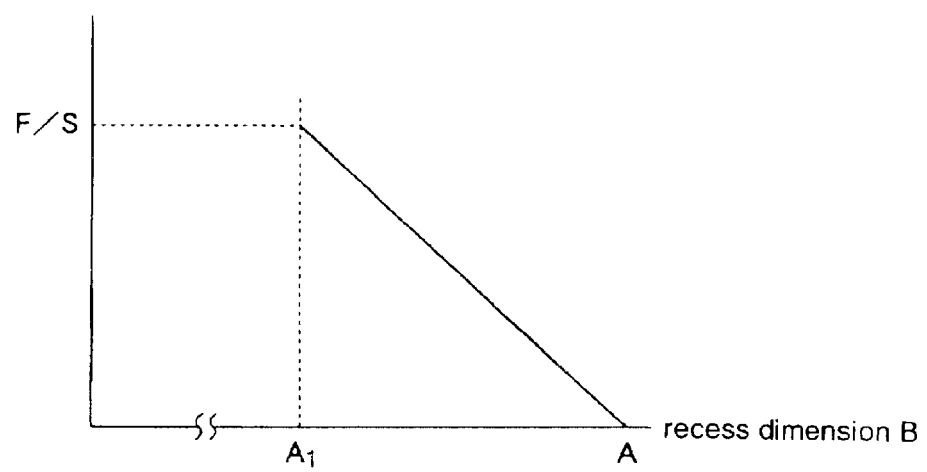
FIG. 11 is a view for explaining the value of the pre-loading based on the difference between the recess dimension and the core dimension.

When the dimension B at room temperature is selected to a value between the dimensions A and A1 in the step S41, the amount of pre-load applicable to the magnetostriction oscillator 34 on the basis of the selected dimension is as shown in FIG. 11.

The difference between the dimensions A and A1 is about 0.2% of the dimension A as previously discussed, which is in the order of 0.2 mm when the dimension A is 100 mm for example, so that the necessary and sufficient hole machining accuracy is 2/100 mm and this is not difficult to attain.

The value of the dimension B should be determined on the basis of the needed pre-load, but the actual value taking the machining accuracy and the ease of the insertion into consideration may be selected to be some where about:

$$B=A-(A-A1)2/3$$

While the dimension A1 of the magnetostriction oscillator 34 is to expand to the original dimensions A by returning to room temperature, the expansion is prevented by the wall surface of the dimension B of the recess 1, resulting in the pre-load or pre-stress applied to the core 35 from the opposite ends of the core 35.

Since the thickness of the tubular body 22 is sufficiently large, the applied pre-load does not cause the recess 1 to be deformed.

FIG. 1 is a plan view of the elastic wave generator 34 showing the state in which it is inserted into the recess 1 as explained above, and FIG. 2 is a sectional view taken along line II—II of FIG. 1.

The selection of the dimension B between the dimensions A and A1 of FIG. 11 and the amount of the pre-load F may be varied according to the purpose and the manner of application of the stress wave (elastic wave). The pre-load generated is expressed as:

$$F=ES(A-B)/L$$

Figure 5B:
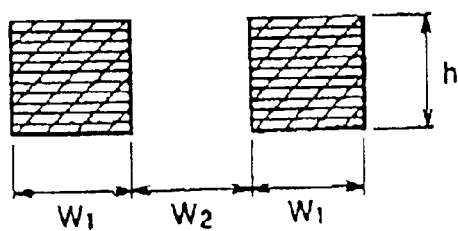

Where,
S: cross-sectional area (2W1h in FIG. 5b)
E: longitudinal elastic factor
L: length of the core (shown in FIG. 5a)

Figure 12:
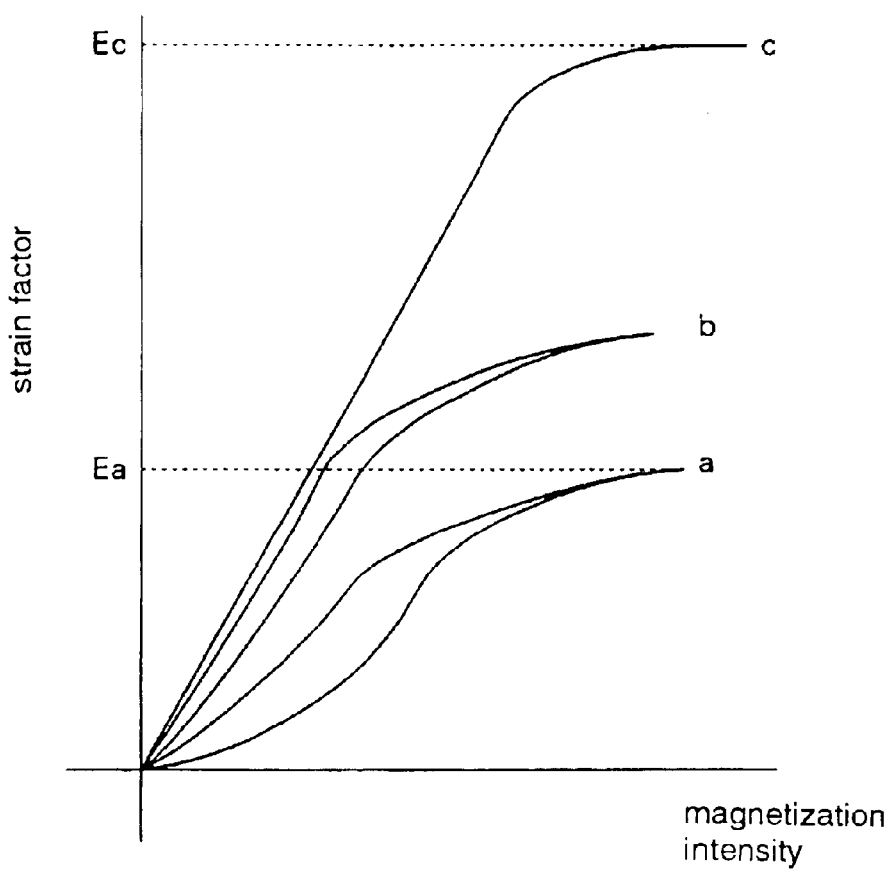
FIG. 12 is a view for explaining the variation in saturation magnetostriction strain rate due to the difference in the pre-loading.
Figure 23:
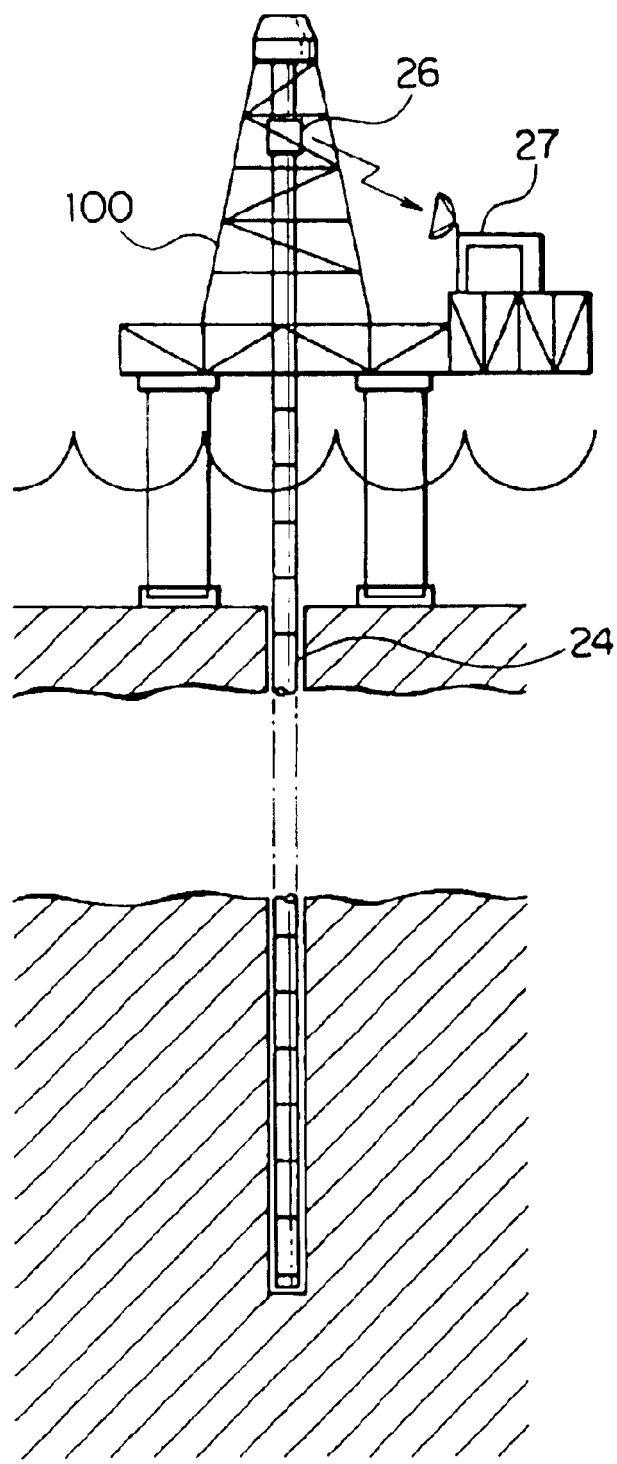
FIG. 23 is a view for explaining a conventional oil drilling facility.
Figure 24:
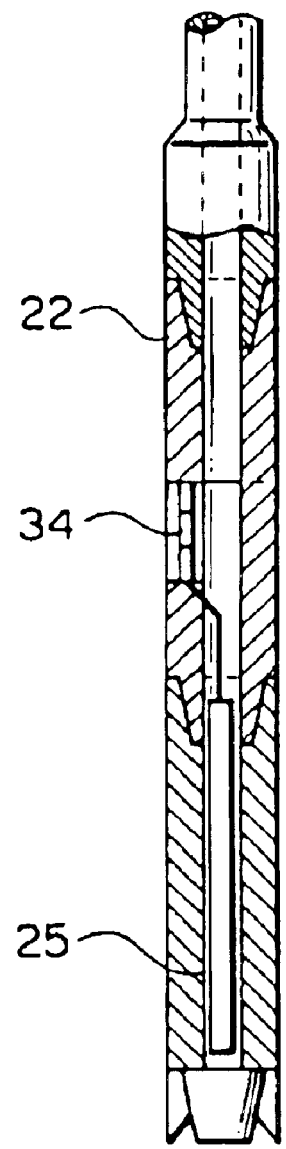
FIG. 24 is a detailed sectional view of the well bottom portion of the drill pipe shown in FIG. 23.
Figures 25A, 25B:
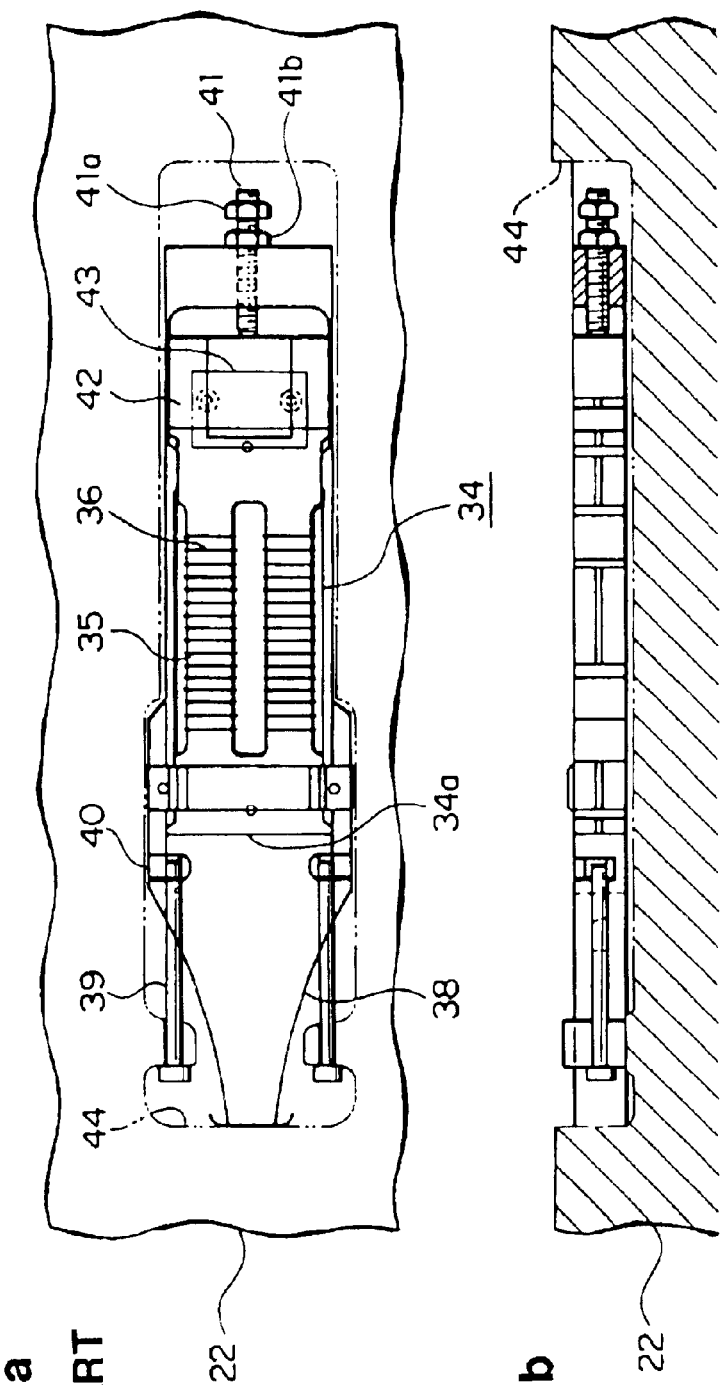
FIGS. 25a and 25b are plan views showing the manner of mounting the magnetostriction oscillator shown in FIG. 24.

FIG. 12 is a graph for showing the results of the experiments conducted by the inventors of the present invention to show, in a simplified form for simplicity of the explanation, the saturation magnetostriction characteristics under the various pre-loading (compression loading). In the figure, a curve a represents the magnetostriction factor as plotted against the intensity of the magnetization with no pre-loading on the magnetostriction oscillator. A curve b represents the magnetostriction factor as plotted against the intensity of the magnetization with a small pre-loading applied to the magnetostriction oscillator in accordance with the conventional structure shown in FIG. 23 (canti-levered structure). A curve c represents the magnetostriction factor as plotted against the intensity of the magnetization with a large pre-loading to the magnetostriction oscillator in accordance with the present invention (large pre-loading).

As seen from FIG. 12, as the pre-load increases, hysterisis in the strain factor against the magnetization intensity decreases, the strain factor in the saturation magnetization increases and the relationship between the strain factor and the magnetization becomes closer to a straight line. Therefore, in order to obtain a large strain factor, it is necessary to research and develop a magnetostriction oscillator that can apply a large pre-load to make the magnetostriction characteristics close to that of the curve c. However, the magnetostriction oscillators that have heretofore been developed are those of the characteristics of the curve b of FIG. 12, resulting in that there is no magnetostriction oscillator developed that can be used in a relatively large structural body such as oil well digging structure or the like. According to the characteristics curve c, the maximum oscillation of the strain obtained in response to the magnetization signal is Ec, which has a strain output a few times larger than that obtained without pre-loading.

Although the magnetostriction oscillator 34 in FIGS. 1 and 2 is illustrated as being inserted in the direction in which the surface of the piezoelectric material 35a of the magnetostriction oscillator 34 is parallel to the surface of the tubular body 22, the oscillator 34 may be inserted so that the surface of the oscillator 34 is perpendicular or oblique to the surface of the tubular body 22. Also, two or more magnetostriction oscillators 34 may be inserted into a single recess 1.

Embodiment 2

Figure 13A:
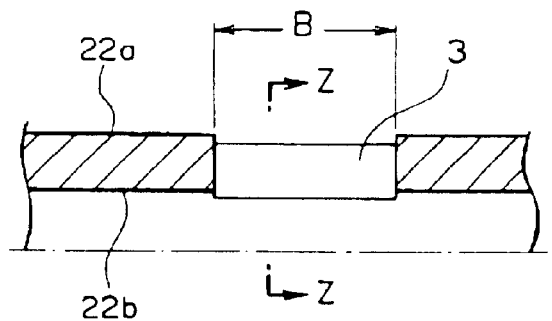
FIGS. 13a and 13b are sectional views for the hole for mounting the magnetostriction oscillator according to the second embodiment of the present invention.
Figure 13B:
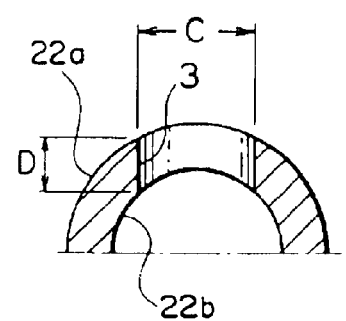

FIGS. 13a and 13b illustrate a through hole 3 which extends through the thickness of the tubular body 22 and which may be equally used instead of the recess 1 shown in FIG. 6, from FIGS. 13a and 13b, it is seen that the bottom wall of the recess 1 shown in FIG. 6 is removed to form the through hole 3 extending through the thickness of the tubular body 22. With the structure shown in these figures, in order to prevent the magnetostriction oscillator 34 from falling into and through the through hole 3 when the cooled magnetostriction oscillator 34 is to be inserted and assembled into the through hole 34, a suitable stop for preventing the oscillator 34 to fall through the through hole 3 may be provided on the wall surface of the through hole 3.

Embodiment 3

Figure 14:
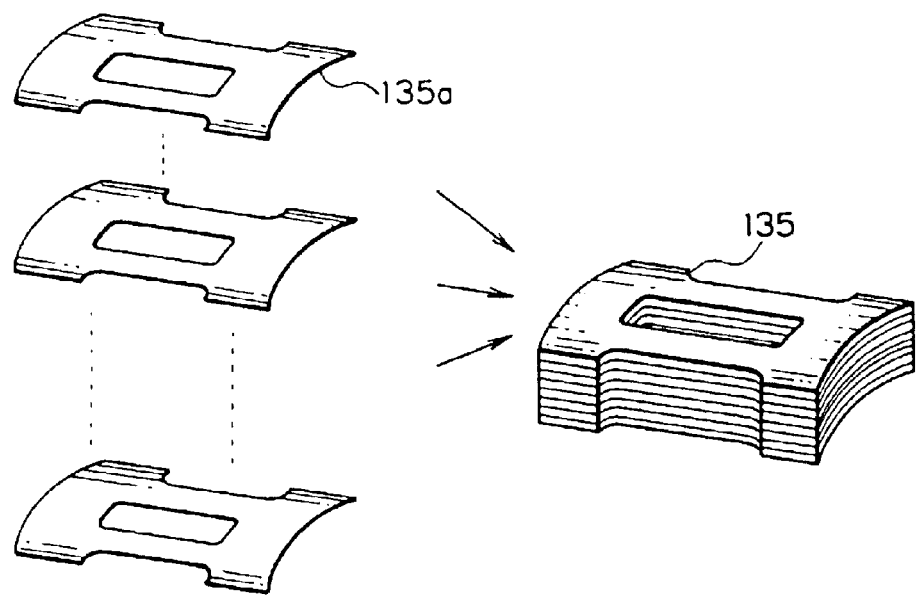
FIG. 14 is a view for explaining the core stacking operation in the magnetostriction oscillator mounting method according to the third embodiment of the present invention.

FIG. 14 is a view for explaining the core stacking operation in the magnetostriction oscillator mounting method according to the third embodiment of the present invention. In FIG. 14, 135 is a curved core made of a stack of curved magnetostriction sheets 135a of a predetermined radius of curvature. Here, the predetermined radius of curvature refers to that of the curved magnetostriction sheets 135a that is bent in the direction perpendicular to the oscillation and in conformity with the radius of curvature of the surface of the object (the tubular body 22) into which the oscillator is inserted.

Figure 15:
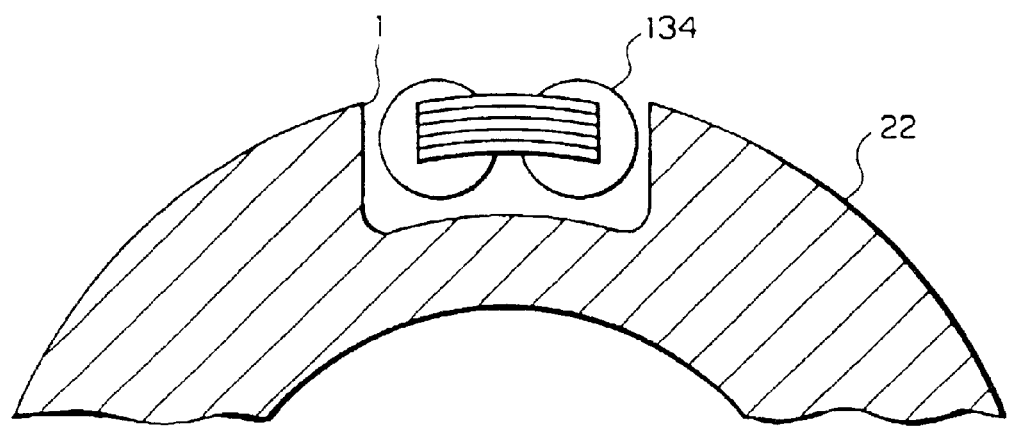
FIG. 15 is a view for explaining the manner of mounting of FIG. 14.

FIG. 15 is a view showing a section when the curved magnetostriction oscillator 135 in which the coil 36 is wound around the curved core 135 shown in FIG. 14. The curved core 135 is advantageous in that the space within the recess 1 can be effectively utilized so that the thickness h of the stack can be made large to obtain a core of a maximum cross sectional area and that the collapsing limit of the core 135 can be increased higher than that of the core 35 having the same cross-sectional area.

Embodiment 4

By inserting a plurality of magnetostriction oscillators 34 in the single hole 3 or the recess 1, or forming a plurality of holes 3 or the recesses 1 in the object and inserting more than one magnetostriction oscillator 34 into the respective holes 3 or recesses 1 and by driving them in a predetermined phase relationship, a larger acoustic output can be radiated into the object.

Figure 16:
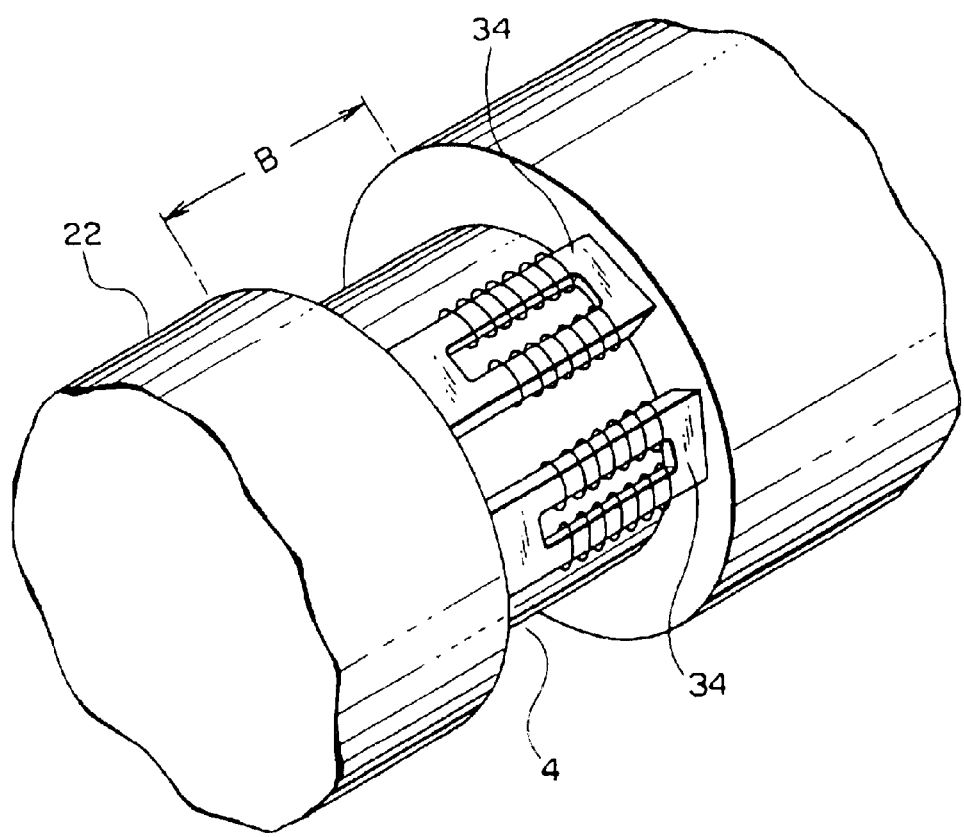
FIG. 16 is a perspective view showing the elastic wave generator according to the fourth embodiment of the present invention.

When the object is the tubular body 22, a groove 4 having a width dimension of B may be formed by continuously providing the recess 1 circumferentially around the tubular body 1 as shown in FIG. 16 and a plurality of magnetostriction oscillators 34 may be inserted into this groove 4. In this case, the pre-load is supported by the bottom portion of the groove 4 of the tubular body 22, so that this bottom portion should have a suitable thickness.

Embodiment 5

A method for improving the linearity of the strain factor of the magnetostriction oscillator 34 has heretofore been known, in which the operation point of the magnetization is moved by applying a suitable magnetic bias.

When such the magnetic bias is to be applied, the core 35 deforms (expands) by the magnetic bias and the pre-load acting on the core 35 mounted in a manner shown in FIGS. 1 and 2 increases further. It is to be noted that the rate of elongation due to the saturation magnetization of the dimension A of the core 35 at room temperature is of the order of 0.01%, which is similar to the elongation at the temperature 10, so that the effect of the magnetization corresponding to the amount of the pre-load is not very large. However, in order to obtain a good result, it is effective to determine of the dimension B of the hole 3 or the recess 1 or the groove 4 with the elongation due to the magnetic bias taken into consideration.

Figure 17:
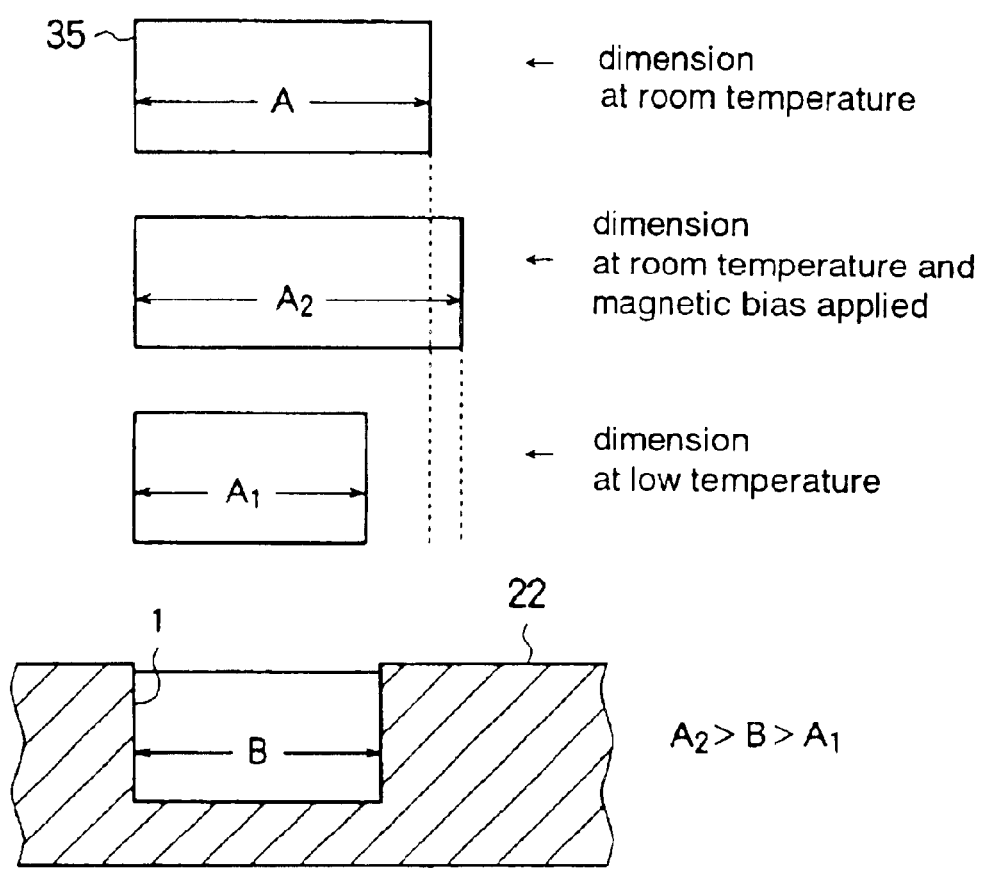
FIG. 17 is a view for explaining the dimensions used in the mounting method of the fifth embodiment of the present invention.

Assuming that the dimension of the core 35 at room temperature is A, the dimension after the cooling by liquid nitrogen is A1 and the dimension under the magnetic bias at room temperature is A2, the dimension B of the hole 3 or the recess 1 must be A2>B>A1, otherwise the insertion is impossible or the insertion is possible but a gap is generated failing to apply a pre-loading. This relationship is illustrated in FIG. 17.

The amount of magnetic bias is generally of the order of one half of the saturation magnetization level in order to obtain the widest linear operating range. However, when the mounting method of the present invention is to be applied, the magnetic bias must be set taking the increase in the saturation magnetization level due to the application of the pre-load into consideration.

The procedure for applying the magnetic bias may be realized by a suitable method such as a method utilizing a permanent magnet, a method providing a direct current excitation coil or a method flowing an overlapping direct current into the coil 36.

Figure 18:
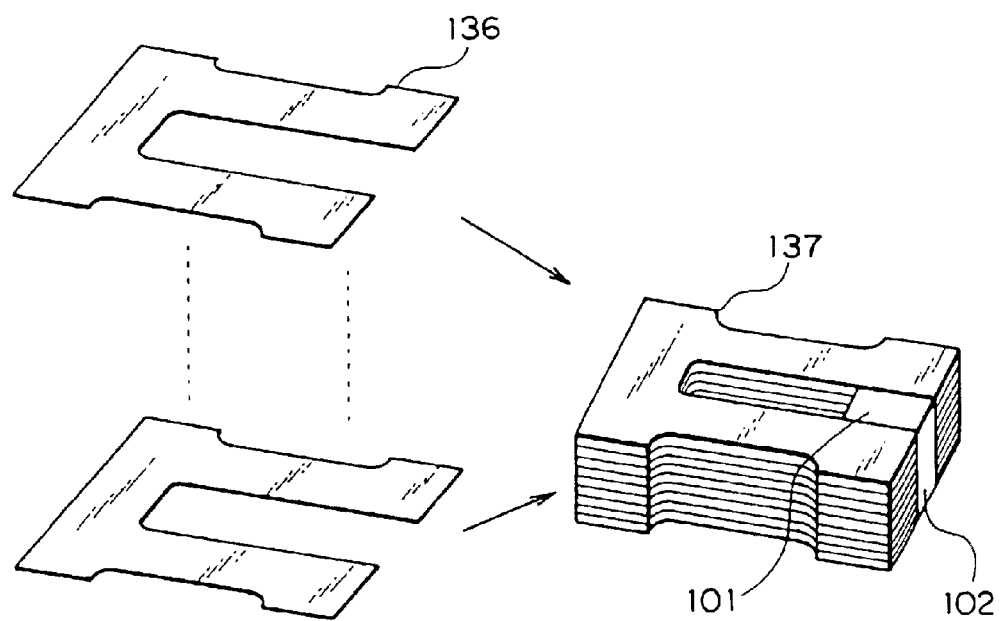
FIG. 18 is a view for explaining the assembled state of the core in the mounting method according t the fifth embodiment of the present invention.

FIG. 18 illustrates an example of the magnetically biased core in which the above is taken into consideration. In FIG. 18, 101 is a permanent magnet for generating the biasing magnetic field and inserted into and held between open ends 102 of a U-shaped core 137 made by a plurality of U-shaped magnetic plates 136 stacked and fixed by resin.

Figure 19:
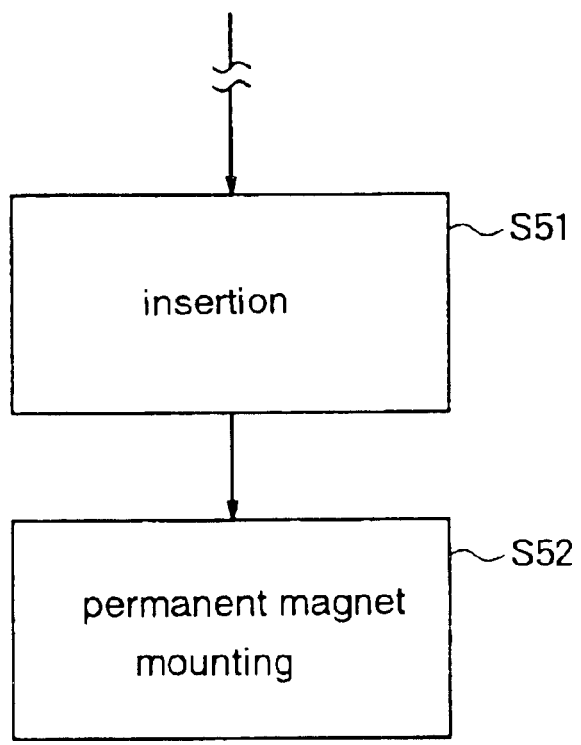
FIG. 19 is a flow chart showing the operation of FIG. 18.

FIG. 19 illustrates a step of manufacturing the magnetic core 137 of the magnetically-biased elastic wave generating device shown in FIG. 18, from which it is seen that the permanent magnet is inserted between the open ends 102 of the magnetostriction U-shaped core 137 after the insertion step S51 out of the manufacturing steps of the elastic wave generating device shown in FIG. 4.

Embodiment 6

Figure 20:
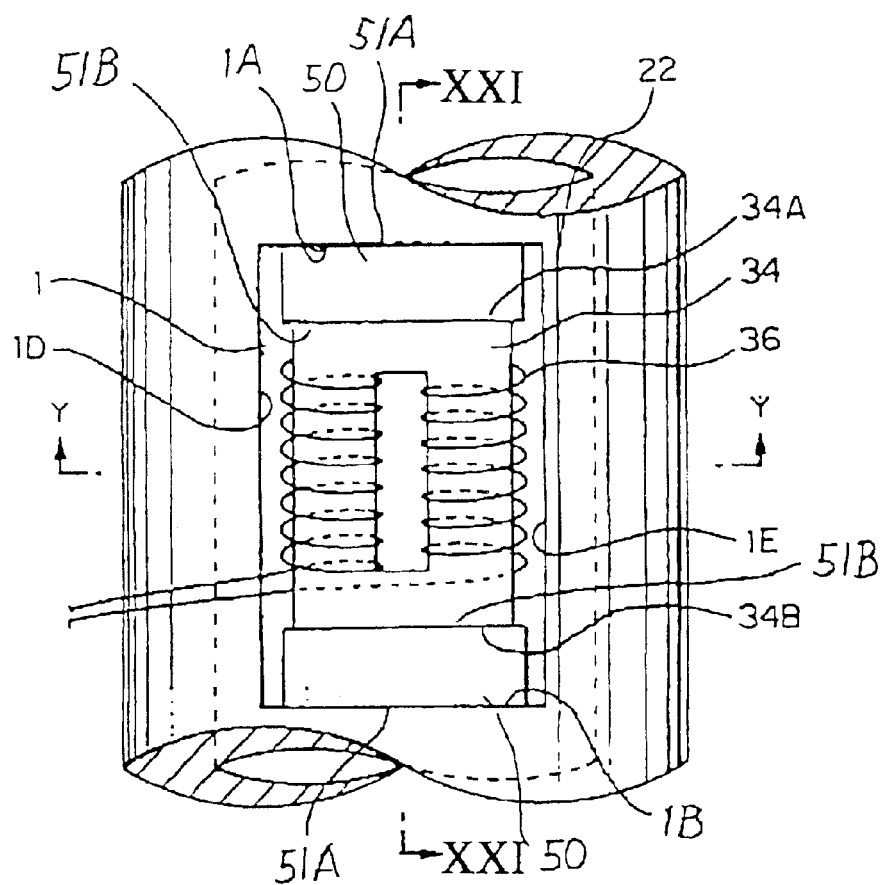
FIG. 20 is a plan view of an elastic wave generator of the sixth embodiment of the present invention.
Figure 21:
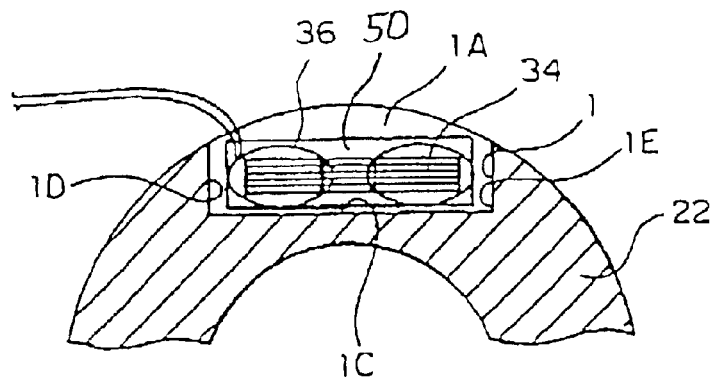
FIG. 21 is a sectional view taken along line XXI—XXI of FIG. 20.

In the embodiment shown in FIGS. 20 and 21, non-magnetic spacers 50 are disposed in the spaces defined between the support surfaces 1A and 1B of the oscillator support 22 and the end surfaces 34A and 34B of the magnetostriction oscillator 34. As illustrated, the spacers 50 are secured by the shrink-fit at the position between the support surface 1A of the recess 1 of the tubular body 22 and the end surface 34A of the magnetostriction oscillator 34 as well as at the position between the support surface 1B of the recess 1 of the tubular body 22 and the end surface 34B of the magnetostriction oscillator 34 so that they are positioned at the opposite ends of the magnetostriction member within the recess 1.

The spacers 50 are made of a non-magnetic material such as a non-magnetic metallic material such as a stainless steel and has, in the illustrated example, the end surface 51A to be brought into contact with the support surface 1A or 1B and the end surface 51B to be brought into contact with the end surface 34A or 34B of the oscillator 34 that are mirror-finished surfaces parallel to each other. Since the support surfaces 1A and 1B of the recess 1 are mirror-finished surfaces parallel to each other, the support surfaces of the magnetostriction oscillator 34 defined by the end surfaces 34A and 34B of the spacer 50 are parallel to each other. In other words, the support surface of the support 22 for supporting the magnetostriction oscillator 34 is defined by the surface 51B of the non-magnetic spacer 50.

According to this structure, when the tubular member is made of a magnetic material such as iron, steel or the like, its magnetic influence can be avoided by the non-magnetic spacer 50. Therefore, the present invention can be utilized when the oscillator support 22 is made of a magnetic material.

Upon inserting the spacer 50 together with the magnetostriction oscillator 34 in the recess 1 by the shrink-fit, either one or both of the magnetostriction oscillator 34 and the spacer 50 are cooled as explained in connection with previous embodiments and placed together within the recess 1 and heated to the room temperature. When the tube 22 is to be heated, the magnetostriction oscillator 34 and the spacer 50 are inserted together into the heat-expanded recess 1 and then the tube 22 is returned to the room temperature, whereby the magnetostriction oscillator 34 and the spacer 50 can be firmly shrink-fitted together.

The technical gist of the explanations of the foregoing embodiments 1 to 4 can be summarized as follows and the longitudinal elastic wave generator in which the strain of the oscillator can be made to the necessary intensity and the polarity and the frequency can be freely controlled.

(1) To the magnetostriction element in which the lamination surface of the stack of the magnetostriction thin sheets of the metallic crystalline structure having positive strain characteristics is electrically insulated and secured in lamination by a bonding agent to provide a mechanical strength similar to that of the steel, an excitation winding is applied in the direction of the magnetostriction, and (2) the magnetostriction oscillator of which operation point is adjusted by the permanent magnet so that the desired amount of stress can be obtained.

(3) In order that the all of the magnetostriction strain generated by the excitation current can be converted into the internal stress, a pocket having a length corresponding to the initial compression stress needed in the magnetostriction material is formed in the non-magnetic metallic tube or rod or prism having a rigidity of a coefficient of thermal expansion similar to that of the magnetostriction material, and (4) the temperature difference between the magnetostriction material and the non-magnetic metallic tube, rod or prism is utilized to integrally assemble them by the cooling fit or the heating fit.

Figure 22:
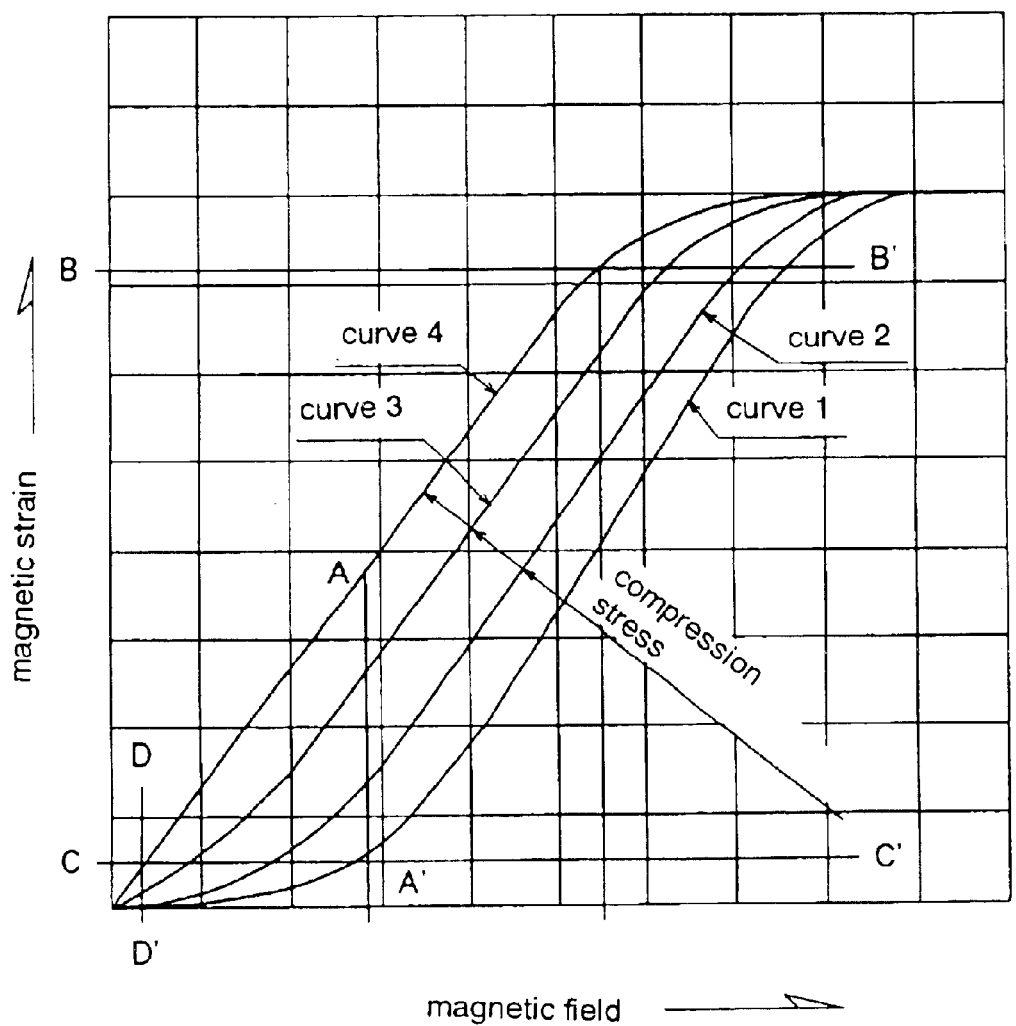
FIG. 22 is a graph showing the characteristics of the magnetostriction characteristics of the magnetostriction oscillator assembled by the pre-loading.

FIG. 22 is a graph showing the characteristics of the magnetostriction characteristics of the magnetostriction oscillator assembled by the pre-loading. Curve 1 is a magnetostriction curve in the state in which there is no magnetic bias or external stress. Curves 2 to 4 are magnetostriction curves in the state in which external stresses are applied. As the applied external stress increases, the number of the curve increases. Vertical line A, A shows the value of the magnetic bias by the permanent magnet or the direct current excitation. Horizontal lines B, B and C, C shows the range of the strain to be controlled. The value of the magnetic bias is to be set to the vertical line A, A of FIG. 1 when positive and negative stress waves are to be generated, and to the vertical line D, D when the stress is always positive or the stress is in the form of impulses.

The amount of external stress applied as a pre-load to the magnetostriction oscillator should be equal to or larger than a magnetostriction force corresponding to the maximum value of the magnetic field for controlling. The external stress is determined on the basis of the cross-sectional area of the stress-generating surface of the magnetostriction oscillator and the Young's module and the contraction amount of the magnetostriction material. The magnetostriction oscillator longer than that of the pocket by the amount of contraction is cooled by a cryogenic coolant such as liquid nitrogen to shorten, and the shortened oscillator is inserted into the pocket and then heated therein to return the oscillator to its original length so that a static stress (pre-load) may always be applied to the magnetostriction oscillator. When the magnetostriction oscillator in this state is excited, the amount of strain of the oscillator generated by the excitation is converted into a stress or a longitudinal elastic wave. On the other hand, the magnetostriction material itself can generate only one way strain of either positive (expansion) or negative (contraction). Therefore, in order to generate an elastic wave in negative direction with the magnetostriction material of the positive direction, a stress for the negative strain must be given in the magnetostriction material. This stress is generated by a permanent magnet or a flow of direct current excitation current through the excitation winding. Then, when an excitation current is supplied to flow in the negative direction, the stress decreases and thus a negative stress is generated. Thus, in order to control the positive and negative stress or the longitudinal elastic wave, the adjustment and the control of the magnetic characteristics of the magnetostriction oscillator is an element. If the structure to be integrated has magnetic characteristics, the characteristics of the magnetostriction oscillator, i.e., the control of the stress is significantly affected, so that the structure for integrating is made of a non-magnetic material.

Due to the application of a metallic magnetostriction material having positive strain characteristics;
(1) a large pre-loading can be applied, enabling a large strain stress to be generated; and
(2) an excessive vibration and impact can be accommodated due to a mechanical strength similar to that of copper:

Due to the pre-loading by the cooling shrink-fitting;
(3) most of the magnetic strain is converted into the stress, increasing the oscillation efficiency;
(4) the frequency band is expanded so that the free control can be achieved from the direct current to the high frequency;
(5) the acoustic coupling factor between the oscillator and the structural body is significantly improved to improve the injection efficiency and the propagation efficiency;
(6) the positive and the negative stress can be generated at will with a suitable magnetic bias and pre-loading;

(7) a non-magnetic material is used in the structural body to be integrated, so that the magnetostriction element alone can be magnetically adjusted, eliminating the effect of the ground magnetism; and
(8) from all these results, the inspection or the transmission which has been impossible with a huge structural body or drill pipes can be carried out at a high accuracy and a high reliability.

While the present invention has been described as applied to the tubular member of the drill string for use in the digging rig in the first to fourth embodiments, the present invention should not be limited to such the tubular member, but is equally applicable to a flat surface, such as iron plate, H-shaped steel or the like. The device may be attached to one part of the iron frame of the steel structure such as the bridge girder, building structural framework.

As has been described, an elastic wave generator of the present invention comprises: an excitation coil; a magnetostriction oscillator around which the excitation coil is wound and made of a lamination of magnetostriction sheets having a metallic crystalline structure which exhibits positive strain characteristics in which its length varies directionally upon magnetic excitation; and an oscillator support having a first support surface shrink-fit against a first end surface of the magnetostriction oscillator intersecting the direction along which the length of the magnetostriction oscillator changes and a second support surface shrink-fit against a second end surface of the magnetostriction oscillator intersecting the direction along which the length of the magnetostriction oscillator changes, whereby the changes in the length of the magnetostriction oscillator due to the magnetic excitation of the excitation coil appearing at the first and second end surfaces is directly supported by the first and second support surfaces. Therefore, the elastic wave generator can be realized in which the generation and the injection of a large stress wave that has not heretofore been solved.

According to the elastic wave generator mounting structure of the present invention for mounting a magnetostriction oscillator to an object to which an elastic wave is irradiated, the magnetostriction oscillator is inserted within the hole or recess smaller than the magnetostriction oscillator so that the magnetostriction oscillator is held in the state to which a pre-load is applied, so that a pre-load much larger than that obtained by the conventional canti-levered clamping screw.

Also, according to the method for mounting a magnetostriction oscillator of the present invention, the pre-load is applied through the use of the expansion and contraction force due to the temperature coefficient of the magnetostriction material, a very large pre-load can be applied.

Also, according to the method for mounting the magnetostriction oscillator of the present invention, the dimension of the hole or the recess is made larger than the dimension when the magnetostriction oscillator is cooled by the liquid nitrogen and is made smaller than the dimension when the magnetic bias is applied at room temperature, so that the effect of the magnetostriction deformation due to the magnetic bias can be utilized in generating the pre-load, thereby increasing the pre-load.

What is claimed is:
1. A method of mounting a magnetostriction oscillator to an object to which an elastic wave is transmitted, the magnetostriction oscillator comprising an excitation coil wound around a stack of sheets of a metallic magnetostriction material bonded together with an electrically insulating bonding agent, for generating an elastic wave in a direction parallel to the sheets by passing an excitation current through the excitation coil, the method comprising:

forming two opposing elastic wave radiation end surfaces of a magnetostriction oscillator by stacking the sheets to form two parallel end surfaces intersecting at right angles with an elastic wave radiation direction, the end surfaces of the magnetostriction oscillator being spaced apart from each other by a distance A at room temperature;

providing, in an oscillator support, a hole or a recess having two parallel wall surfaces intersecting at right angles with the elastic wave radiation direction and spaced apart from each other by a distance B at room temperature, wherein the distance B is smaller than the distance A;

cooling the magnetostriction oscillator until the distance between the two end surfaces of the magnetostriction oscillator becomes a distance A1, smaller than the distance B;

inserting the magnetostriction oscillator, while cooled, into the hole or recess of the oscillator support; and raising the temperature of the magnetostriction oscillator to room temperature to bring the end surfaces of the magnetostriction oscillator into direct contact with respective wall surfaces of the oscillator support.

2. The method of mounting a magnetostriction oscillator as claimed in claim 1, including cooling the magnetostriction oscillator with liquid nitrogen until the distance between the two end surfaces of the magnetostriction oscillator becomes the distance A1.

3. The method of mounting a magnetostriction oscillator, as claimed in claim 1, including:

applying a magnetic bias to the magnetostriction oscillator by inserting a permanent magnet within the magnetostriction oscillator, thereby changing the distance between the end surfaces of the magnetostriction oscillator at room temperature to a distance A2; and providing, in the oscillator support, the hole or the recess having two parallel wall surfaces intersecting at right angles with the elastic wave radiation direction and spaced apart from each other by a distance B at room temperature, wherein the distance B is smaller than the distance A2.

4. A method of mounting a magnetostriction oscillator to an object to which an elastic wave is transmitted, the magnetostriction oscillator comprising an excitation coil wound around a stack of sheets of a metallic magnetostriction material bonded together with an electrically insulating bonding agent, for generating an elastic wave in a direction parallel to the sheets by passing an excitation current through the excitation coil, the method comprising:

forming two opposing elastic wave radiation end surfaces of a magnetostriction oscillator by stacking the sheets to form two parallel end surfaces intersecting at right angles with an elastic wave radiation direction, the end surfaces of the magnetostriction oscillator being spaced apart from each other by a distance A at room temperature;

forming a non-magnetic spacer having two opposed parallel faces spaced apart from each other by a distance C at room temperature;

providing, in an oscillator support, a hole or a recess having two parallel wall surfaces intersecting at right angles with the elastic wave radiation direction and spaced apart from each other by a distance B at room temperature, wherein the distance B is smaller than the distance A plus the distance C;

cooling the magnetostriction oscillator until the distance between the two end surfaces of the magnetostriction oscillator becomes a distance A1, smaller than the distance A;

inserting the magnetostriction oscillator, while cooled, and the non-magnetic spacer into the hole or recess of the oscillator support with the non-magnetic spacer interposed between one of the end surfaces of the magnetostriction oscillator and one of the wall surfaces of the oscillator support; and raising the temperature of the magnetostriction oscillator, to room temperature to bring a first of the end surfaces of the magnetostriction oscillator into direct contact with a first of the wall surfaces of the oscillator support and to bring the faces of the non-magnetic spacer into direct contact with a second of the end surfaces of the magnetostriction oscillator and a second of the wall surfaces of the oscillator support, respectively.

5. The method of mounting a magnetostriction oscillator as claimed in claim 4, including cooling the magnetostriction oscillator with liquid nitrogen until the distance between the two end surfaces of the magnetostriction oscillator becomes the distance A1.

6. The method of mounting a magnetostriction oscillator, as claimed in claim 4, including:

applying a magnetic bias to the magnetostriction oscillator by inserting a permanent magnet within the magnetostriction oscillator, thereby changing the distance between the end surfaces of the magnetostriction oscillator at room temperature to a distance A2; and providing, in the oscillator support, the hole or the recess having two parallel wall surfaces intersecting at right angles with the elastic wave radiation direction and spaced apart from each other by a distance B at room temperature, wherein the distance B is smaller than the distance A2.

7. A method of mounting a magnetostriction oscillator to an object to which an elastic wave is transmitted, the magnetostriction oscillator comprising an excitation coil wound around a stack of sheets of a metallic magnetostriction material bonded together with an electrically insulating bonding agent, for generation an elastic wave in a direction parallel to the sheets by passing an excitation current through the excitation coil, the method comprising:

forming two opposing elastic wave radiation end surfaces of a magnetostriction oscillator by stacking the sheets to form two parallel end surfaces intersecting at right angles with an elastic wave radiation direction, the end surfaces of the magnetostriction oscillator being spaced apart from each other by a distance A at room temperature;

forming a pair of non-magnetic spacers, each spacer having two opposed parallel faces spaced apart from each other by a distance C at room temperature;

providing, in an oscillator support, a hole or a recess having two parallel wall surfaces intersecting at right angles with the elastic wave radiation direction an spaced apart from each other by a distance B at room temperature, wherein the distance B is smaller than the distance A plus the distance 2C;

cooling the magnetostriction oscillator until the distance between the two end surfaces of the magnetostriction oscillator becomes a distance A1, smaller than the distance A;

inserting the magnetostriction oscillator, while cooled, and the two non-magnetic spacers into the hole or recess of the oscillator support, with each of the non-magnetic spacers at a respective end surface of the magnetostriction oscillator; and raising the temperature of the magnetostriction oscillator to room temperature to bring a first of the faces of each of the non-magnetic spacers into direct contact with respective wall surfaces of the oscillator support and to bring a second of the faces of each of the non-magnetic spacers into direct contact with respective end surfaces of the magnetostriction oscillator.

8. The method of mounting a magnetostriction oscillator as claimed in claim 7, including cooling the magnetostriction oscillator with liquid nitrogen until the distance between the two end surfaces of the magnetostriction oscillator becomes the distance A1.

9. The method of mounting a magnetostriction oscillator, as claimed in claim 7, including:

applying a magnetic bias to the magnetostriction oscillator by inserting a permanent magnet within the magnetostriction oscillator, thereby changing the distance between the end surfaces of the magnetostriction oscillator at room temperature to a distance A2; and providing, in the oscillator support, the hole or the recess having two parallel wall surfaces intersecting at right angles with the elastic wave radiation direction and spaced apart from each other by a distance B at room temperature, wherein the distance B is smaller than the distance A2.

\* \* \* \* \*